United States Patent
Sutton

(12) United States Patent (10) Patent No.: US 6,646,846 B2
Sutton (45) Date of Patent: Nov. 11, 2003

(54) APPARATUS AND METHOD FOR STAGED POWER LOAD TRANSFER

(76) Inventor: James A. Sutton, 228 Oakhurst Rd., Statesville, NC (US) 28677

( * ) Notice: Subject to any disclaimer, the term of this patent is extended or adjusted under 35 U.S.C. 154(b) by 183 days.

(21) Appl. No.: 10/040,872

(22) Filed: Oct. 29, 2001

(65) Prior Publication Data

US 2003/0080626 A1 May 1, 2003

(51) Int. Cl.[7] ............................................... H02H 3/20
(52) U.S. Cl. ........................................................ 361/90
(58) Field of Search .................... 361/54–56, 59, 361/60, 72, 74, 75, 78, 83, 86, 88–90, 91.1, 91.3, 92, 93.1, 93.4, 94

(56) References Cited

U.S. PATENT DOCUMENTS

| | | |
|---|---|---|
| 4,256,972 A | 3/1981 | Wyatt et al. |
| 4,405,867 A | 9/1983 | Moakler et al. |
| 4,679,411 A | 7/1987 | Pearse, Jr. |
| 4,695,738 A | 9/1987 | Wilmot |
| 4,701,690 A | 10/1987 | Fernandez et al. |
| 4,782,241 A | 11/1988 | Baker et al. |
| 4,987,513 A * | 1/1991 | Shelley .......................... 361/92 |
| 5,210,685 A | 5/1993 | Rosa |
| 5,488,565 A * | 1/1996 | Kennon et al. .............. 700/306 |
| 5,627,716 A | 5/1997 | Lagree et al. |
| 5,640,300 A * | 6/1997 | Azotea .......................... 361/87 |
| 5,654,859 A | 8/1997 | Shi |
| 5,811,960 A | 9/1998 | Van Sickle et al. |
| 5,821,642 A | 10/1998 | Nishhira et al. |
| 5,924,924 A | 7/1999 | Richardson |
| 6,191,500 B1 | 2/2001 | Toy |
| 6,292,717 B1 * | 9/2001 | Alexander et al. ........... 700/293 |
| 6,437,951 B1 * | 8/2002 | Ahlstrom et al. .............. 361/42 |

* cited by examiner

*Primary Examiner*—Matthew V. Nguyen
(74) *Attorney, Agent, or Firm*—Adams Evans P.A.

(57) ABSTRACT

An apparatus for isolating electrical loads during a power supply transfer interruption event, including an electrical circuit interposed between an electrical power source and a load which has a voltage detector for continuously detecting voltage supplied to the load from the power source, comparing the detected voltage against a predetermined desired voltage and outputting a signal indicative of an out-of-limits voltage condition from the power source to the load, an interrupt switch for receiving the output from the voltage detector and interrupting the supply of power to the load during an interval of no more than 1 cycle of the power supply, and a reset switch for restoring the power supply to the load.

15 Claims, 4 Drawing Sheets

APPARATUS AND METHOD FOR STAGED POWER LOAD TRANSFER

TECHNICAL FIELD AND BACKGROUND OF THE INVENTION

This invention relates to an apparatus and method for staged power load transfer, with particular application in agricultural operations. As described below, the apparatus and method also has application in many other fields, as well. Many modern agricultural systems, including ventilation systems, controlled environment housing, computerized controls and many other applications require a nearly constant supply of electricity. More automation has resulted in changes in how emergency back-up power is supplied. P.T.O. generators have been in use for many years, and remain in use on many farms today. However, many farms have changed to engine-driven back-up generators with automatic transfer switches. These systems offer many advantages to the farmer beyond providing an emergency source of power, including quicker response time to power outages, automatic operation, remote operation, increased flexibility and the ability to participate in utility load management options.

These new systems require a different approach to load management during and after load transfer, particularly since most of the these systems are electronically controlled, often by microprocessors, and are thus very sensitive to anomalies such as power surges, dips, transients and voltage fluctuations. The more sophisticated the control, the more sensitive it is to these problems.

Electrical utilities strive to provide uninterrupted electricity within a relatively narrow range of standard characteristics. However, constant adherence to these narrow standards is impossible in situations where hundreds of customers are served over dozens or hundreds of miles of power lines from the same circuits. An electrical failure or disturbance at one customer's facility can affect all of the other customers served from the same circuits. Large motor stops and starts, capacitor switching and other circuit operations create line disturbances that can effect the operation of electronic devices. Utilities require large motors to be equipped with devices which limit current inrush (starting kva) so that distribution line voltage will not dip below a certain minimum value. These same problems can occur at a single site, for example, a poultry farm, when a utility interruption causes a switch to back-up power. Even though most motors, such as fan motors, are relatively small, collectively they can add up to a very large drain on current supplied by a generator. Therefore, one embodiment of the present invention "stages" the start-up of motors to limit current inrush and prevent voltage dips and surges. In addition, one embodiment of the present invention enhances smooth starting by using a relay which energizes at the exact time of "zero crossing,", i.e, when the instantaneous supply voltage is at zero. Finally, the present invention utilizes a fast response load isolation that protects motor loads and electronics during power switching transitions.

SUMMARY OF THE INVENTION

Therefore, it is an object of the invention to provide a power load transfer circuit apparatus and method.

It is another object of the invention to provide a power load transfer circuit which includes staged load addition to a power supply.

It is another object of the invention to provide a power load transfer circuit which uses a relay which energizes at the exact time of zero crossing when the instantaneous supply voltage is at zero.

It is another object of the invention to provide a power load transfer circuit which uses a relay which turns off at the exact time of zero crossing when the instantaneous supply voltage is at zero.

It is another object of the invention to provide a power load transfer circuit which utilizes fast response load isolation that protects motor loads and electronics during power switching transitions.

These and other objects of the present invention are achieved in the preferred embodiments disclosed below by providing an apparatus for isolating electrical loads during a power supply transfer interruption event, comprising an electrical circuit interposed between an electrical power source and a load which comprises a voltage detector for continuously detecting voltage supplied to the load from the power source, comparing the detected voltage against a predetermined desired voltage and outputting a signal indicative of an out-of-limits voltage condition from the power source to the load, an interrupt switch for receiving the output from the voltage detector and interrupting the supply of power to the load during an interval of no more than 1 cycle of loss of the normal power supply after detecting the out-of-limits voltage condition, and a reset switch for restoring the power supply to the load.

According to one preferred embodiment of the invention, the power load transfer circuit includes a zero-crossing circuit for permitting the switch to interrupt the power supply only at the zero-crossing point of the power being supplied to the load.

According to another preferred embodiment of the invention, the reset switch includes a delay circuit for delaying restoration of power to the load after an interruption of power to the load.

According to yet another preferred embodiment of the invention, the reset switch comprises a variable resistor in the form of a potentiometer for permitting the delay to be varied in accordance with a predetermined optimum time for power restoration after interruption.

According to yet another preferred embodiment of the invention, an apparatus is provided for isolating electrical loads during a power supply transfer interruption event, including an electrical circuit interposed between an electrical power source and a plurality of loads comprising a plurality of voltage detectors for continuously detecting voltage supplied to the plurality of loads from the power source, comparing the detected voltage against a predetermined desired voltage and outputting a signal indicative of an out-of-limits voltage condition from the power source to any one of the plurality of loads, an interrupt switch for receiving an output from the voltage detectors and interrupting the supply of power to the loads in no more than 1 cycle of the power supply from the point of the out-of-limit voltage detection, and a reset switch for restoring the power supply to the loads.

According to yet another preferred embodiment of the invention, the power load transfer circuit includes a plurality of switches connected to respective ones of the loads, each of the switches including a delay circuit for delaying restoration of power to the loads after an interruption of power to the loads.

According to yet another preferred embodiment of the invention, at least some of the delay circuits includes a variable timer for varying the time of activation of the reset switches relative to each other as desired to permit the power to be restored to the loads in a predetermined sequence.

According to yet another preferred embodiment of the invention, each of the delay circuits include a variable timer.

A method for isolating electrical loads during a power supply transfer interruption event according to an embodiment of the invention comprises the steps of continuously detecting a voltage supplied to the load from a power source, comparing the detected voltage against a predetermined desired voltage, outputting a signal indicative of an out-of-limits voltage condition from the power source to the load, interrupting the supply of power to the load during an interval of no more than 1 cycle of the power supply from the point of the out-of-limit voltage detection, and restoring the power supply to the load upon termination of the out-of-limits voltage condition.

According to yet another preferred embodiment of the invention, the method includes the step of permitting the interruption of the power supply only at the zero-crossing point of the power being supplied to the load.

According to yet another preferred embodiment of the invention, the method includes the step of restoring the power supply to the load includes the step of delaying restoration of power to the load after an interruption of power to the load.

According to yet another preferred embodiment of the invention, the step of restoring the power supply to the load comprises the step of varying the delay in restoration of the power supply in accordance with a predetermined optimum time interval for power restoration after interruption.

A method for isolating a plurality of loads during a power supply transfer interruption event according to the invention comprises the steps of continuously detecting voltage supplied to the plurality of loads from the power source, comparing the detected voltage against a predetermined desired voltage, and outputting a signal indicative of an out-of-limits voltage condition from the power source to any one of the plurality of loads, interrupting the supply of power to the loads in no more than 1 cycle of the power supply from the detection of the out-of-limits condition, restoring the power supply to the loads upon termination of the out-of-limits voltage condition.

According to yet another preferred embodiment of the invention, the method includes the step of delaying restoration of power to the loads after an interruption of power to the loads.

According to yet another preferred embodiment of the invention, the method includes the step of varying the time of restoration of the power to the loads in predetermined intervals.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
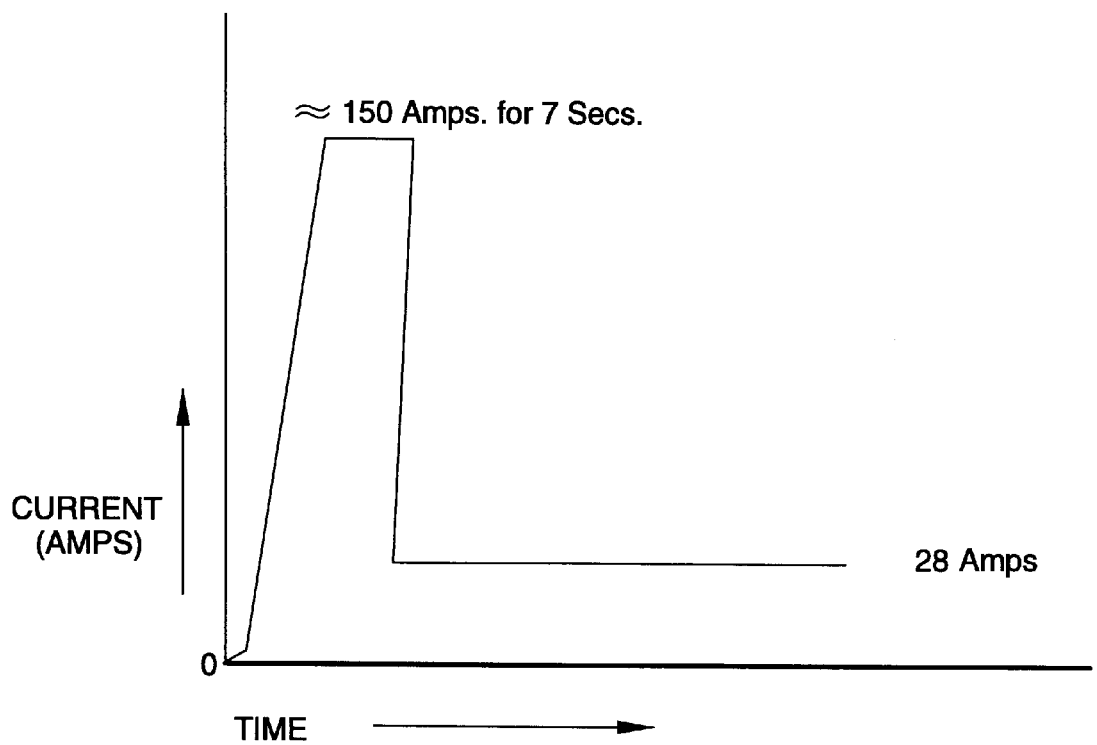
FIG. 1 is a graph illustrating the result of a prior art power load method.

Referring now specifically to FIG. 1, a graph representing a typical prior art method of starting a series of motors is shown. In FIG. 1, four motors drawing 7 amps during normal steady state operation are assumed. Assuming also that these motors are all started at the same time it can be seen that the initial start-up draws current of approximately 150 amps for about seven seconds before the motors transition to normal operating current of 28 amps (4 motors at 7 amps). The dramatic current inrush thus caused can easily damage sensitive computer and other microprocessor-based equipment, as discussed above.

Figure 2:
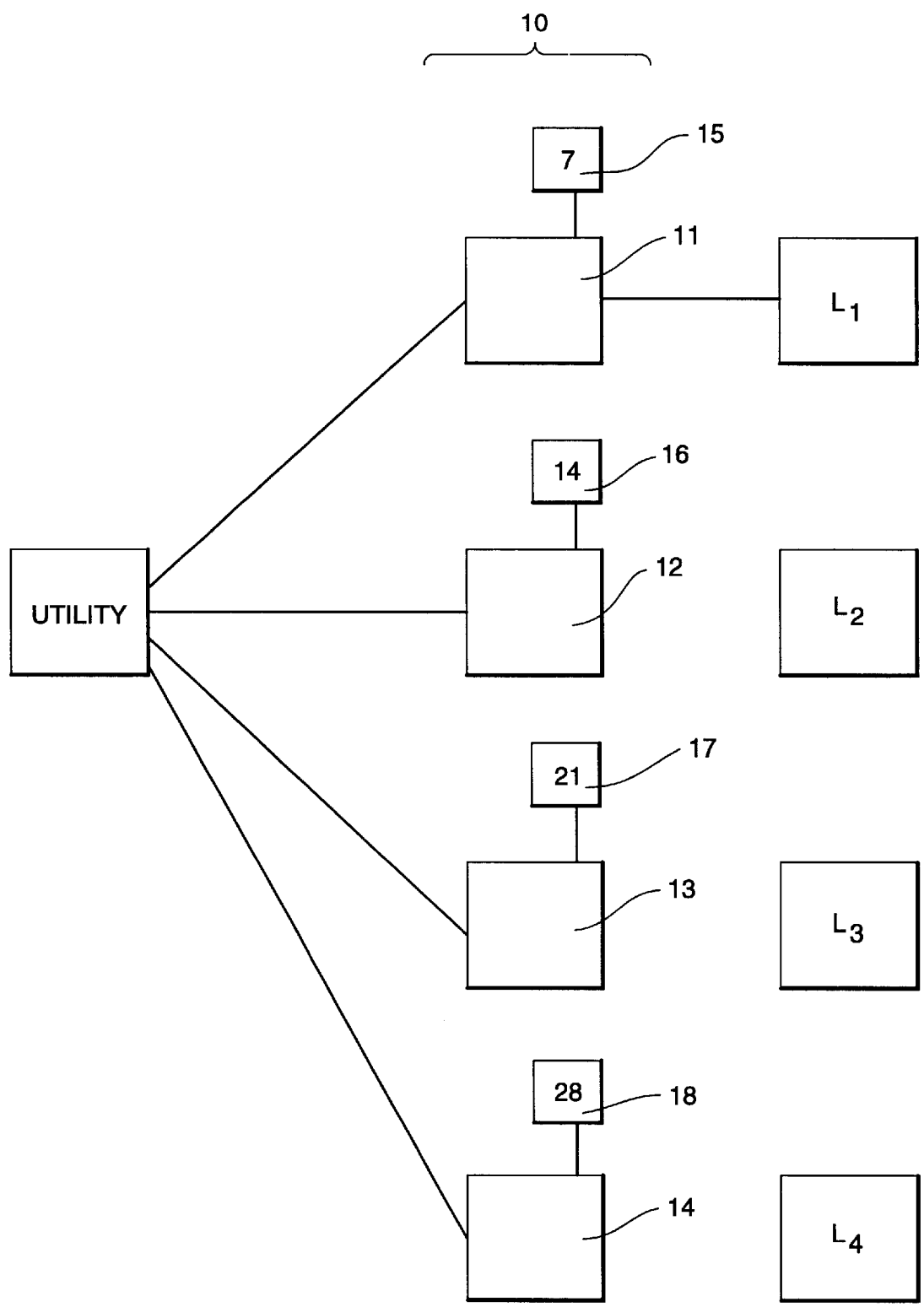
FIG. 2 is a block diagram of a utility-supplied series of loads controlled by individual power load circuits according to an embodiment of the invention.

Referring now to FIG. 2, a staged load transfer system 10 in which the invention would be useful is shown. Electrical power may be supplied by a source such as a public electric utility, as shown. Loads $L_1$–$L_4$ inclusive represent loads, such as motors, which require high initial current to achieve operating condition. Staged load transfer circuits 11, 12, 13 and 14 are interposed between the power supply and the loads $L_1$–$L_4$. These circuits are provided with timers 15, 16, 17 and 18 which can be set to allow current to flow to the loads $L_1$–$L_4$ in a staged sequence, for example, in seven second intervals, as shown. In the case of the loads $L_1$–$L_4$ being motors, each motor is permitted to accelerate up to its steady state operating speed and current requirements before allowing current to flow to the next motor.

Figure 3:
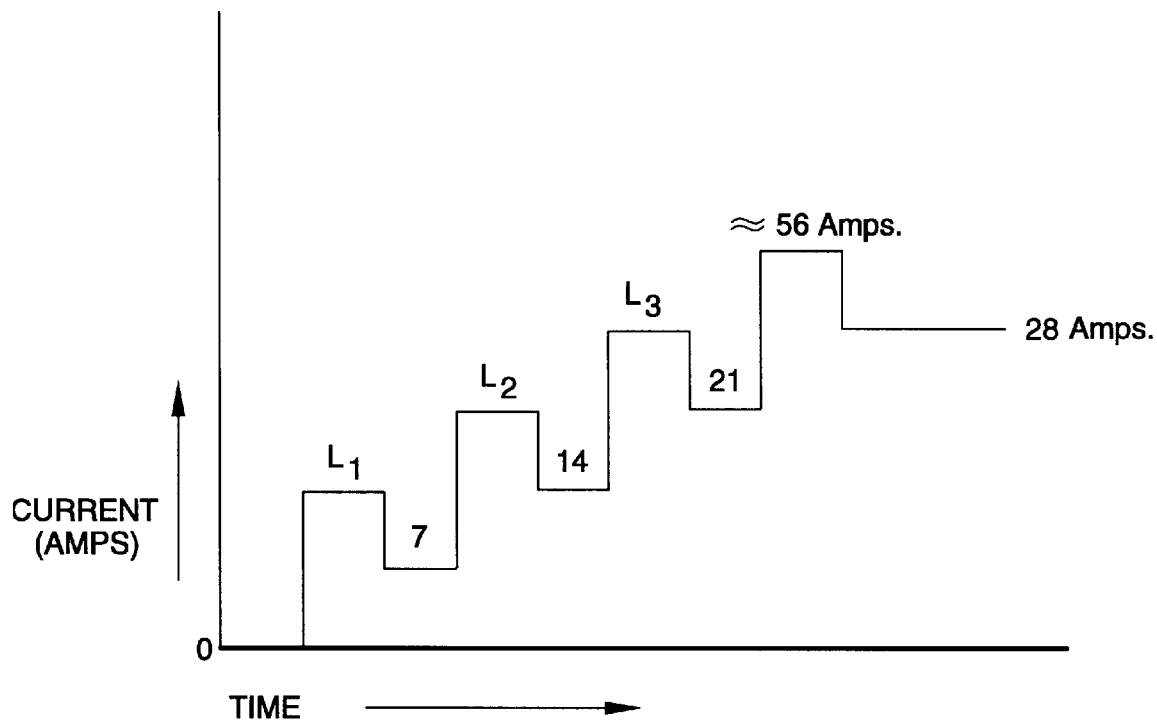
FIG. 3 is a graph illustrating the power load method according to an embodiment of the invention.

The improvement in the current requirements is shown in FIG. 3, where it can be seen that each motor requires approximately twice the normal operating current during start-up, and that the currents are additive as the motors are placed on-line. By comparing FIGS. 1 and 3 it can be seen that the maximum current required to start the motors using the inventive circuit (FIG. 3) is approximately one-half the current required when all of the motors are placed on-line at one time. Moreover, the current is added more gradually, decreasing the incidence and intensity of surging and spiking.

It should be noted that the circuit 10 has utility whether all of the loads are taken off-line at the same time or at different times. Circuit 10 does not affect when or how the loads go off-line. That is the function of a circuit breaker or other overload devices. Circuit 10 controls the manner in which the loads are placed back in service.

Figure 4:
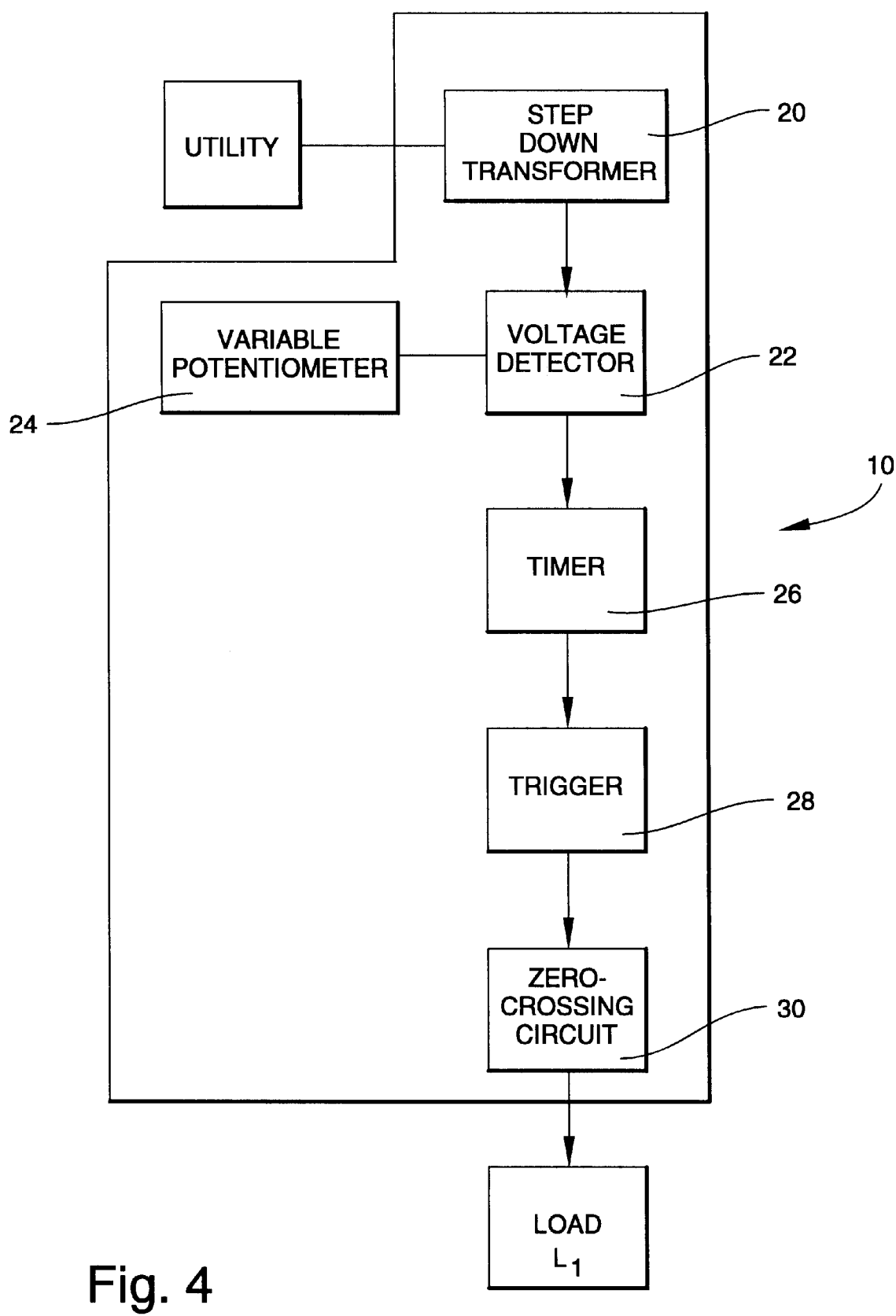
FIG. 4 is a block diagram of a single power load circuit.

Referring now to FIG. 4, the circuit 10 is shown schematically in further detail, and includes a step-down transformer 20 for providing operating current for the circuit from the same power supply that is supplying operating current to the load $L_1$. A voltage detector 22 in the form of a comparator determines voltage in the system. A variable potentiometer 24 permits each circuit 10 to be set for a different delay setting so that each load is added in sequence.

The timer 26 comprises a variable resistor which allows adjustment of amount of delay before current is allowed to flow to a load. A capacitor is charged through the comparator of the voltage detector 22. The comparator compares a reference voltage with current which is being used to charge a capacitor. When the charge in the capacitor is the same as the reference voltage, an output capacitor goes "high", and activates a trigger 28.

The trigger 28 comprises a LED and transistor which turns on a light in an optically-isolated triac. A low voltage condition in the comparator discharges a capacitor which turns off the trigger 28. A signal indicative of an out-of-limits voltage condition from the power source to the load is sent to an interrupt switch, which interrupts the supply of power to the load during an interval of no more than 1 cycle of the power supply. It may take 1–3 cycles to detect the out-of-limits condition. Back EMF must be burned up by resistive loads, and the coil on the transformer must collapse. However, once the condition is detected, the supply of power is interrupted during a single cycle.

A reset switch restores the power supply to the load.

This circuit thus provides a fast response isolation of the loads, particularly when power is lost from a utility and a back-up generator is brought on-line to supply power during the utility power interruption. These occurrences can result from load transfer, capacitor switching, back emf from free wheeling electric motors, and from the generator as it adjusts for load starting and load changing. Out of phase transfer is eliminated by isolating the load from the power supply virtually immediately when a low voltage condition is detected by the voltage detector 22. Then, restart is delayed until the generator has stabilized the voltage, and then energizes each of the loads in sequence, as described above.

A zero-crossing circuit 30 includes a phototriac which detects the light from the optically-isolated triac of the trigger 28, but which only allows a change of state at the zero-crossing point, i.e, when the instantaneous supply voltage is at zero. This provides smooth starting and minimizes current inrush.

The circuit 10 operates when transferring loads from a utility power source to another power source such as a back-up generator, and back to the utility power source when utility power is restored and the loads are taken off of back-up generator power.

An apparatus and method for staged power load transfer is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

What is claimed is:

1. An apparatus for isolating electrical loads during a power supply transfer interruption event, comprising an electrical circuit interposed between an electrical power source and a load, and comprising:
   (a) a voltage detector for continuously detecting voltage supplied to the load from the power source, comparing the detected voltage against a predetermined desired voltage and outputting a signal indicative of an out-of-limits voltage condition from the power source to the load;
   (b) an interrupt switch for receiving the output from the voltage detector and interrupting the supply of power to the load during an interval of no more than 1 cycle of the power supply after detecting the out-of-limits voltage condition; and
   (c) an automatic reset switch for restoring the power supply to the load.

2. An apparatus according to claim 1, and including a zero-crossing circuit for permitting the switch to interrupt the power supply only at the zero-crossing point of the power being supplied to the load.

3. An apparatus according to claim 1, wherein said reset switch includes a delay circuit for delaying restoration of power to the load after an interruption of power to the load.

4. An apparatus according to claim 1, wherein said reset switch comprises a variable resistor for permitting the delay to be varied in accordance with a predetermined optimum time for power restoration after interruption.

5. An apparatus for isolating electrical loads during a power supply transfer interruption event, comprising an electrical circuit interposed between an electrical power source and a plurality of loads, and comprising:
   (a) a plurality of voltage detectors for continuously detecting voltage supplied to the plurality of loads from the power source, comparing the detected voltage against a predetermined desired voltage and outputting a signal indicative of an out-of-limits voltage condition from the power source to any one of the plurality of loads;
   (b) an interrupt switch for receiving an output from the voltage detectors and interrupting the supply of power to the loads in no more than 1 cycle of the power supply after detecting an out-of-limit voltage condition; and
   (c) an automatic reset switch for restoring the power supply to the loads.

6. An apparatus according to claim 5, and including a plurality of switches connected to respective ones of said loads, each of said switches including a delay circuit for delaying restoration of power to the loads after an interruption of power to the loads.

7. An apparatus according to claim 6, wherein at least some of said delay circuits includes a variable timer for varying the time of activation of the reset switches relative to each other as desired to permit the power to be restored to the loads in a predetermined sequence.

8. An apparatus according to claim 7, wherein each of the delay circuits include a variable timer.

9. A method for isolating electrical loads during a power supply transfer interruption event, comprising the steps of:
   (a) continuously detecting a voltage supplied to the load from a power source;
   (b) comparing the detected voltage against a predetermined desired voltage;
   (c) outputting a signal indicative of an out-of-limits voltage condition from the power source to the load;
   (d) interrupting the supply of power to the load during an interval of no more than 1 cycle of the power supply after detecting an out-of-limits voltage condition; and
   (e) restoring the power supply to the load upon termination of the out-of-limits voltage condition.

10. A method according to claim 9, and including the step of permitting the interruption of the power supply only at the zero-crossing point of the power being supplied to the load.

11. A method according to claim 9, wherein the step of restoring the power supply to the load includes the step of delaying restoration of power to the load after an interruption of power to the load.

12. A method according to claim 9, wherein the step of restoring the power supply to the load comprises the step of varying the delay in restoration of the power supply in accordance with a predetermined optimum time interval for power restoration after interruption.

13. A method for isolating a plurality of loads during a power supply transfer interruption event, comprising the steps of:
   (a) continuously detecting voltage supplied to the plurality of loads from the power source;
   (b) comparing the detected voltage against a predetermined desired voltage;
   (c) outputting a signal indicative of an out-of-limits voltage condition from the power source to any one of the plurality of loads;
   (d) interrupting the supply of power to the loads in no more than 1 cycle of the power supply; and
   (e) restoring the power supply to the loads upon termination of the out-of limits voltage condition.

14. A method according to claim 13, and including the step of delaying restoration of power to the loads after an interruption of power to the loads.

15. A method according to claim 14, and including the step of varying the time or restoration of the power to the loads in predetermined intervals.

* * * * *